(12) United States Patent  
Maruyama et al.

(10) Patent No.: US 7,408,503 B2
(45) Date of Patent: Aug. 5, 2008

(54) POSITIONING SYSTEM, POSITIONING APPARATUS, POSITIONING INFORMATION PROVIDING APPARATUS, POSITIONING METHOD, CONTROL PROGRAM FOR POSITIONING SYSTEM, AND COMPUTER READABLE RECORDING MEDIUM HAVING RECORDED THEREIN CONTROL PROGRAM FOR POSITIONING SYSTEM

(75) Inventors: Akira Maruyama, Minami Azumi-Gun (JP); Tomoyuki Kurata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 163 days.

(21) Appl. No.: 11/230,490

(22) Filed: Sep. 21, 2005

(65) Prior Publication Data

US 2006/0066478 A1    Mar. 30, 2006

(30) Foreign Application Priority Data

Sep. 24, 2004   (JP) .............................. 2004-276593

(51) Int. Cl.
*G01S 1/00*   (2006.01)
(52) U.S. Cl. ................................. 342/357.09
(58) Field of Classification Search ............ 342/357.13, 342/357.09
See application file for complete search history.

(56) References Cited

U.S. PATENT DOCUMENTS 6,675,011 B1 *  1/2004  Kita ........................ 455/422.1
6,963,749 B2 * 11/2005  Hayashida ............... 455/456.6
6,975,266 B2 * 12/2005  Abraham et al. ....... 342/357.02

FOREIGN PATENT DOCUMENTS

JP         2002311122 A     10/2002

* cited by examiner

*Primary Examiner*—Thomas H. Tarcza
*Assistant Examiner*—Nga X Nguyen
(74) *Attorney, Agent, or Firm*—Global IP Counselors, LLP

(57) ABSTRACT

A positioning system is provided to set easily initial position information at a low cost without using a database in which positions of base stations are stored. A GPS server 200 has a server positioning section 210a that receives a position related signal transmitted by a GPS satellite to obtain data. A server-orbit-information acquiring program 232 analyzes the data to generate orbit information 262 and stores orbit information 262 in a server third storing unit 260 (ST30). A satellite-direction-information generating program 234 generates satellite direction information 264a, which includes an elevation angle and an azimuth angle of the GPS satellite viewed from a reference point (ST31). A generation-time-information generating program 236 acquires the time when the satellite direction information 264a is generated from a server clock section 218a and stores the time in the server third storing unit 260 (ST32).

8 Claims, 9 Drawing Sheets

ELEVATION ANGLE/DISTANCE TABLE 154

| ELEVATION ANGLE(°) | SATELLITE DISTANCE(km) |
|---|---|
| 30 < θ ≦ 50 | 24000 |
| 50 < θ ≦ 70 | 22000 |
| 70 < θ ≦ 90 | 20000 |

FIG. 7

BASE STATION POSITION

| ITEM | SIZE (BYTE) | REMARKS |
|---|---|---|
| GPS TIME(sec) | 4 | 0〜604799 |
| LATITUDE(rad) | 4 | |
| LONGITUDE(rad) | 4 | |
| ALTITUDE(m) | 4 | |
| TOTAL | 16 | |

FIG. 8A (Prior Art)

SATELLITE DIRECTION

| ITEM | SIZE (BYTE) | REMARKS |
|---|---|---|
| GPS TIME(sec) | 4 | 0〜604799 |
| ELEVATION ANGLE(deg) | 1 | 0〜90 |
| AZIMUTH ANGLE(deg) | 2 | 0〜360 |
| TOTAL | 7 | |

FIG. 8B

POSITIONING SYSTEM, POSITIONING APPARATUS, POSITIONING INFORMATION PROVIDING APPARATUS, POSITIONING METHOD, CONTROL PROGRAM FOR POSITIONING SYSTEM, AND COMPUTER READABLE RECORDING MEDIUM HAVING RECORDED THEREIN CONTROL PROGRAM FOR POSITIONING SYSTEM

CROSS-REFERENCE TO RELATED APPLICATIONS

This application claims priority to Japanese Patent Application No. 2004-276593. The entire disclosure of Japanese Patent Application No. 2004-276593 is hereby incorporated herein by reference.

BACKGROUND OF THE INVENTION

1. Field of the Invention

The present invention generally relates to a positioning system. More specifically, the present invention relates to a positioning system, a positioning apparatus, a positioning information providing apparatus, a positioning method, a control program for the positioning system, and a computer readable recording medium having recorded therein the control program for the positioning system.

2. Background Information

Conventionally, a Global Positioning System (GPS) device has been used as a positioning system that utilizes an artificial satellite to measure a position. In the GPS, an initial position of a positioning apparatus is necessary in order to acquire a GPS satellite and to use the initial position as an initial value for position calculation. A previous positioning position is often used as the initial position. In a car navigation system, in general, positioning is performed repeatedly at short time intervals. Thus, even if a previous position is used as the initial position, a distance between an actual position of the positioning apparatus and the initial position is generally small and no specific problems result. However, for example, in the case of a portable terminal mounted with the GPS device, when a user moves a long distance in a short time by train or other high speed transportation after performing positioning and performs positioning again after arriving at a destination and if the user uses a previous positioning position as an initial position, a gap between the initial position and an actual position may increase causing troubles in positioning.

Japanese Patent Publication JP-A-2002-311122 (especially FIG. 6, etc.) discloses a constitution in which a position of a base station of a cellular phone network is used as an initial position. JP-A-2002-31122 is hereby incorporated by reference.

However, in order to use a position of a base station as an initial position, it is necessary to decide positions of a large number of base stations through location survey and register the respective positions in a database. Thus, there is a problem in that large cost and labor are required.

There is also a problem in that, when a new base station is built or a location of an existing base station is changed, work for location survey and work for updating the database have to be performed every time.

In view of the above, it will be apparent to those skilled in the art from this disclosure that there exists a need for an improved a positioning system, a positioning apparatus, a positioning information providing apparatus, a positioning method, a control program for the positioning system, and a computer readable recording medium having recorded therein the control program for the positioning system. This invention addresses this need in the art as well as other needs, which will become apparent to those skilled in the art from this disclosure.

SUMMARY OF THE INVENTION

An advantage of the invention is to provide a positioning system, a positioning apparatus, a positioning information providing apparatus, a positioning method, a control program for the positioning system, and a computer readable recording medium having recorded therein the control program for the positioning system that can easily set initial position information at a low cost.

According to a first aspect of the present invention, a positioning system is provided. The positioning system includes a positioning apparatus, a positioning information providing apparatus, a communication network, and a base station. The positioning apparatus performs positioning utilizing positional information satellites. The positioning information providing apparatus provides positioning information, which the positioning apparatus uses in order to generate an initial position information indicating a general position of the positioning apparatus. The communication network allows the positioning apparatus to communicate with the positioning information providing apparatus. The base station mediates communication between the positioning apparatus and the positioning information providing apparatus. The positioning information providing apparatus includes an orbit information acquiring section, a reference-point-information storing unit, a satellite-direction-information generating section, a time information generating section, and a positioning information transmitting section. The orbit information acquiring section on a positioning information providing apparatus side acquires orbit information indicating orbits of the positional information satellites. The reference-point-information storing unit on a positioning information providing apparatus side stores reference point information indicating coordinates of a reference point serving as a reference for calculating the initial position information. The satellite-direction-information generating section generates satellite direction information, which indicates elevation angles and azimuth angles of the positional information satellites at the reference point, on the basis of the orbit information and the reference point information. The time information generating section generates time information indicting time when the positioning information providing apparatus generates the satellite direction information. The positioning information transmitting section transmits the positioning information to the positioning apparatus in response to a request from the positioning apparatus. The positioning apparatus includes an orbit information acquiring section, a reference-point-information storing unit, a positioning information acquiring section, a satellite distance information generating unit, a satellite-general-position-information generating section, a satellite present-position-information generating section, and an initial-position-information generating section. The orbit information acquiring section on a positioning apparatus side acquires the orbit information. The reference-point-information storing unit on a positioning apparatus side stores the reference point information. The positioning information acquiring section acquires the satellite direction information and the time information from the positioning information providing apparatus through the communication network. The satellite distance information generating unit generates satellite distance information, which indicates distances between the reference point and the positional information satellites, on the basis of the reference point information and the satellite direction information. The satellite-general-position-information generating section generates satellite general position information, which indicates general positions of the positional information satellites at the time when the satellite direction is generated, on the basis of the reference point information and the satellite direction information. The satellite-present-position-information generating section generates satellite present position information, which indicates positions of the positional information satellites at a point when the positioning apparatus performs positioning, on the basis of the orbit information. The initial-position-information generating section generates the initial position information on the basis of the reference point information, the satellite general position information, and the satellite present position information.

According to the first aspect of the present invention, the positioning system includes the positioning apparatus that performs positioning utilizing positional information satellites, for example, a portable terminal mounted with a GPS device, the positioning information providing apparatus that provides the positioning apparatus with positioning information, for example, a GPS server, and the communication network to allow the positioning apparatus and the positioning information providing apparatus to perform communications, for example, a portable communication network and a base station.

The orbit information acquiring section on a positioning information providing apparatus side of the positioning information providing apparatus acquires satellite orbit information indicating orbits of the positional information satellites, for example, an almanac and an ephemeris in a GPS. The satellite orbit information is necessary to generate elevation angle information described later.

The reference-point-information storing unit of the positioning information providing apparatus, for example, is a storage having a Random Access Memory (RAM) that stores coordinates of a reference point.

The satellite-direction-information generating section of the positioning information providing apparatus calculates elevation angles and azimuth angles of the positional information satellites at the reference point on the basis of satellite orbit information acquired by the orbit information acquiring section on a positioning information providing apparatus side and reference point information. When a plurality of positional information satellites is present, the satellite-direction-information generating section calculates, elevation angles and azimuth angles for the respective satellites. An elevation angle of a satellite is an angle formed by a horizontal plane at the reference point and a straight line connecting the positional information satellite and the reference point (e.g., $\theta$ in FIG. 1A). An azimuth angle is an angle indicating an azimuth in which the positional information satellite is present with the North at the reference point as a reference (e.g., $\phi$ in FIG. 1A).

The time information generating section of the positioning information providing apparatus generates time information indicting the time when satellite direction information and satellite distance information are generated. This time information is information required when the positioning apparatus generates initial position information.

The orbit information acquiring section on a positioning apparatus side of the positioning apparatus acquires orbit information in the same manner as the orbit information acquiring section on a positioning information providing apparatus side. This orbit information is used when a satellite-present-position-information generating section described later calculates positions of the positional information satellites.

The positioning information acquiring section of the positioning apparatus sends a transmission request for positioning information to a positioning-supplementary-information providing apparatus through the communication network to acquire thereby satellite direction information and time information that are examples of the positioning information.

A satellite-distance-information generating section of the positioning apparatus generates satellite distance information indicating distances between the reference point and the positional information satellites on the basis of reference point information and satellite direction information.

The satellite-general-position-information generating section of the positioning apparatus generates satellite-general-position information (e.g., S0 in FIG. 1A) on the basis of reference point information and satellite distance information read out from the reference-point-information storing unit on a positioning apparatus side and satellite direction information acquired from the positioning information server. First, a direction of a positional information satellite viewed from a reference point (e.g., P in FIG. 1A) is decided according to an elevation angle and an azimuth angle of the positional information satellite. Then, it is possible to set a point, which is a satellite distance (e.g., D in FIG. 1A) apart from the reference point in the direction of the positional information satellite, (e.g., S0 in FIG. 1A) as a general position of the positional information satellite at a time when positioning information is generated.

The satellite-present-position-information generating section of the positioning apparatus generates satellite present position information, which indicates a position at the present time of the positional information satellite, (e.g., St in FIG. 1B) on the basis of orbit information and the present time.

The initial-position-information generating section of the positioning apparatus generates coordinates of an initial position (e.g., I in FIG. 1B) by adding, for example, a vector (e.g., d in FIG. 1B) with a satellite general position (e.g., S0 in FIG. 1B) as a start point and a satellite present position (e.g., St in FIG. 1B) as an end point to coordinates of the reference point.

With such a constitution, in the positioning system according to the first aspect of the invention, it is possible to set an initial position in the positioning apparatus without using a database in which positions of base stations are stored. In other words, it is possible to set an easily initial value in the positioning apparatus at low a cost.

A positioning system, according to a second aspect of the present invention is the positioning system of the first aspect, wherein the positioning apparatus includes an elevation angle/distance-associating-information storing unit that stores elevation angle/distance associating information that associates elevation angles of the positional information satellites and the satellite distance information. The satellite-distance-information generating section generates the satellite distance information on the basis of the elevation angle/distance-associating information.

According to the second aspect of the present invention, the positioning apparatus stores elevation angle/distance associating information, for example, a table defining a distance corresponding to an elevation angle in the storage. Therefore, the satellite-distance-information generating section can generate satellite distance information simply by referring to the elevation angle/distance associating information without performing complicated calculations.

A positioning system, according to a third aspect of the present invention is the positioning system of the first aspect, wherein the positioning information providing apparatus includes a maximum-elevation-satellite selecting section that selects a maximum elevation satellite, which is a positional information satellite having the largest elevation angle at the reference point at a point when the positioning information is generated, out of the positional information satellite. The positioning information providing apparatus provides the positioning apparatus with the satellite direction information, the satellite distance information, and the time information for the maximum elevation satellite.

According to the third aspect of the present invention, the positioning information providing apparatus has the maximum-elevation-satellite selecting section and can provide the positioning apparatus with satellite direction information and time information for the maximum elevation satellite. Since a satellite having a larger elevation angle is acquired more easily and is less affected by a multi-path, it is possible to increase a probability of the positioning apparatus succeeding in setting of an initial position on the basis of elevation angle information or the like provided.

According to a fourth aspect of the present invention, a positioning information providing apparatus provides a positioning apparatus, which performs positioning utilizing positional information satellites, with positioning information, which the positioning apparatus uses in order to generate an initial position information indicating a general position of the positioning apparatus through a communication network and a base station mediating communication. The positioning information providing apparatus includes an orbit information acquiring section, a reference-point-information storing unit, a satellite-direction-information generating section, a time information generating section, and a positioning information transmitting section. The orbit information acquiring section on a positioning information providing apparatus side acquires orbit information indicating orbits of the positional information satellites. The reference-point-information storing unit on a positioning information providing apparatus side stores reference point information indicating coordinates of a reference point serving as a reference to calculate the initial position information. The satellite-direction-information generating section generates satellite direction information, which indicates elevation angles and azimuth angles of the positional information satellites at the reference point, on the basis of the orbit information and the reference point information. The time information generating section generates time information indicting time when the positioning information providing apparatus generates the satellite direction information and satellite distance information. The positioning information transmitting section transmits the positioning information to the positioning apparatus in response to a request from the positioning apparatus.

According to a fifth aspect of the invention, a positioning apparatus that performs positioning utilizing positional information satellites is provided. The positioning apparatus includes an orbit information acquiring section, a reference-point-information storing unit, a positioning information acquiring section, a satellite distance information generating unit, a satellite-generating unit, a satellite-general position-information generating section, a satellite-present-position information generating section, and an initial-position-information generating section. The orbit information acquiring section on a positioning apparatus side acquires the orbit information. The reference-point-information storing unit on a positioning apparatus side stores the reference point information. The positioning information acquiring section acquires the satellite direction information and the time information from the positioning information providing apparatus through the communication network. The satellite distance information generating unit generates satellite distance information, which indicates distances between the reference point and the positional information satellites, on the basis of the reference point information and the satellite direction information. The satellite-general-position-information generating section generates satellite general position information indicating general positions of the positional information satellites at the time when the satellite direction is generated on the basis of the reference point information and the satellite direction information. The satellite-present-position-information generating section generates satellite-present-position-information, which indicates positions of the positional information satellites at a point when the positioning apparatus performs positioning, on the basis of the orbit information. The initial-position-information generating section generates the initial position information on the basis of the reference point information, the satellite general position information, and the satellite present position information.

According to a sixth aspect of the invention, a positioning method is provided. The method includes: an orbit information acquiring step on a positioning information providing apparatus side in which an orbit information acquiring section on a positioning information providing apparatus side of a positioning information providing apparatus, which provides a positioning apparatus that performs positioning utilizing positional information satellites with positioning information that the positioning apparatus uses in order to generate initial position information indicating a general position of the positioning apparatus thorough a communication network and a base station that mediates communication, acquires orbit information indicating orbits of the positional information satellites; a reference-point-information storing step on a positioning information providing apparatus side in which a reference-point-information storing unit on a positioning information providing apparatus side of the positioning information providing apparatus stores reference point information indicating coordinates of a reference point serving as a reference for calculating the initial position information indicating a general position of the positioning apparatus; a satellite-direction-information generating step in which a satellite-direction-information generating section of the positioning information providing apparatus generates satellite direction information, which indicates elevation angles and azimuth angles of the positional information satellites at the reference point, on the basis of the orbit information and the reference point information; a time information generating step in which a time information generating section of the positioning information providing apparatus generates time information indicating the time when the positioning information providing apparatus generates the satellite direction information; a positioning information transmitting step in which a positioning information transmitting section of the positioning information providing apparatus transmits the positioning information to the positioning apparatus in response to a request from the positioning apparatus; an orbit information acquiring step on a positioning apparatus side in which an orbit information acquiring section on a positioning apparatus side of the positioning apparatus acquires the orbit information; a reference-point-information storing step on a positioning apparatus side in which a reference-point-information storing unit on a positioning apparatus side of the positioning apparatus stores the reference point information; a positioning information acquiring step in which a positioning information acquiring section of the positioning apparatus acquires the satellite direction information and the time information from the positioning information providing apparatus through the communication network; a satellite distance information generating step in which a satellite distance information generating unit of the positioning apparatus generates satellite distance information, which indicates distances between the reference point and the positional information satellites, on the basis of the reference point information and the satellite direction information; a satellite-general-position-information generating step in which a satellite-general-position-information generating section of the positioning apparatus generates satellite general position information, which indicates general positions of the positional information satellites at the time when the satellite direction is generated, on the basis of the reference point information and the satellite direction information; a satellite-present-position-information generating step in which a satellite-present-position-information generating section of the positioning apparatus generates satellite-present-position-information, which indicates positions of the positional information satellites at a point when the positioning apparatus performs positioning, on the basis of the orbit information; and an initial-position-information generating step in which an initial-position-information generating section of the positioning apparatus generates the initial position information on the basis of the reference point information, the time information, the satellite general position information, and the satellite present position information.

According to a seventh aspect of the present invention, a control program for a positioning system is provided. The control program causes a computer to execute: an orbit information acquiring step on a positioning information providing apparatus side in which an orbit information acquiring section on a positioning information providing apparatus side of a positioning information providing apparatus, which provides a positioning apparatus that performs positioning utilizing positional information satellites with positioning information that the positioning apparatus uses in order to generate initial position information indicating a general position of the positioning apparatus through a communication network and a base station that mediates communication, acquires orbit information indicating orbits of the positional information satellites; a reference-point-information storing step on a positioning information providing apparatus side in which a reference-point-information storing unit on a positioning information providing apparatus side of the positioning information providing apparatus stores reference point information indicating coordinates of a reference point serving as a reference to calculate the initial position information indicating a general position of the positioning apparatus; a satellite-direction-information generating step in which a satellite-direction-information generating section of the positioning information providing apparatus generates satellite direction information, which indicates elevation angles and azimuth angles of the positional information satellites at the reference point, on the basis of the orbit information and the reference point information; a time information generating step in which a time information generating section of the positioning information providing apparatus generates time information indicting time when the positioning information providing apparatus generates the satellite direction information; a positioning information transmitting step in which a positioning information transmitting section of the positioning information providing apparatus transmits the positioning information to the positioning apparatus in response to a request from the positioning apparatus; an orbit information acquiring step on a positioning apparatus side in which an orbit information acquiring section on a positioning apparatus side of the positioning apparatus acquires the orbit information; a reference-point-information storing step on a positioning apparatus side in which a reference-point-information storing unit on a positioning apparatus side of the positioning apparatus stores the reference point information; a positioning information acquiring step in which a positioning information acquiring section of the positioning apparatus acquires the satellite direction information and the time information from the positioning information providing apparatus through the communication network; a satellite distance information generating step in which a satellite distance information generating unit of the positioning apparatus generates satellite distance information, which indicates distances between the reference point and the positional information satellites, on the basis of the reference point information and the satellite direction information; a satellite-general-position-information generating step in which a satellite-general-position-information generating section of the positioning apparatus generates satellite general position information indicating general positions of the positional information satellites at the time when the satellite direction is generated on the basis of the reference point information and the satellite direction information; a satellite-present-position-information generating step in which a satellite-present-position-information generating section of the positioning apparatus generates satellite-present-position-information, which indicates positions of the positional information satellites at a point when the positioning apparatus performs positioning, on the basis of the orbit information; and an initial-position-information generating step in which an initial-position-information generating section of the positioning apparatus generates the initial position information on the basis of the reference point information, the time information, the satellite general position information, and the satellite present position information.

According to an eighth aspect of the invention, a computer readable recording medium having recorded therein a control program for a positioning system is provided. The control program causes a computer to execute: an orbit information acquiring step on a positioning information providing apparatus side in which an orbit information acquiring section on a positioning information providing apparatus side of a positioning information providing apparatus, which provides a positioning apparatus that performs positioning utilizing positional information satellites with positioning information that the positioning apparatus uses in order to generate initial position information indicating a general position of the positioning apparatus thorough a communication network and a base station that mediates communication, acquires orbit information indicating orbits of the positional information satellites; a reference-point-information storing step on a positioning information providing apparatus side in which a reference-point-information storing unit on a positioning information providing apparatus side of the positioning information providing apparatus stores reference point information indicating coordinates of a reference point serving as a reference to calculate the initial position information indicating a general position of the positioning apparatus; a satellite-direction-information generating step in which a satellite-direction-information generating section of the positioning information providing apparatus generates satellite direction information, which indicates elevation angles and azimuth angles of the positional information satellites at the reference point, on the basis of the orbit information and the reference point information; a time information generating step in which a time information generating section of the positioning information providing apparatus generates time information indicting time when the positioning information providing apparatus generates the satellite direction information; a positioning information transmitting step in which a positioning information transmitting section of the positioning information providing apparatus transmits the positioning information to the positioning apparatus in response to a request from the positioning apparatus; an orbit information acquiring step on a positioning apparatus side in which an orbit information acquiring section on a positioning apparatus side of the positioning apparatus acquires the orbit information; a reference-point-information storing step on a positioning apparatus side in which a reference-point-information storing unit on a positioning apparatus side of the positioning apparatus stores the reference point information; a positioning information acquiring step in which a positioning information acquiring section of the positioning apparatus acquires the satellite direction information and the time information from the positioning information providing apparatus through the communication network; a satellite distance information generating step in which a satellite distance information generating unit of the positioning apparatus generates satellite distance information, which indicates distances between the reference point and the positional information satellites, on the basis of the reference point information and the satellite direction information; a satellite-general-position-information generating step in which a satellite-general-position-information generating section of the positioning apparatus generates satellite general position information indicating general positions of the positional information satellites at the time when the satellite direction is generated on the basis of the reference point information and the satellite direction information; a satellite-present-position-information generating step in which a satellite-present-position-information generating section of the positioning apparatus generates satellite-present-position-information indicating positions of the positional information satellites at a point when the positioning apparatus performs positioning on the basis of the orbit information; and an initial-position-information generating step in which an initial-position-information generating section of the positioning apparatus generates the initial position information on the basis of the reference point information, the time information, the satellite general position information, and the satellite present position information.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 is a view of a schematic diagram showing a structure of an elevation angle/distance table of the positioning system;

FIGS. 8A and 8B are views of schematic diagrams showing data sizes of positioning information of the positioning system;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Note that, since embodiments to be described below are preferred specific examples of the invention, technically preferable various limitations are attached to the embodiments. However, the scope of the invention is not limited to these forms unless there are descriptions specifically limiting the invention in the following explanation.

Figure 2:
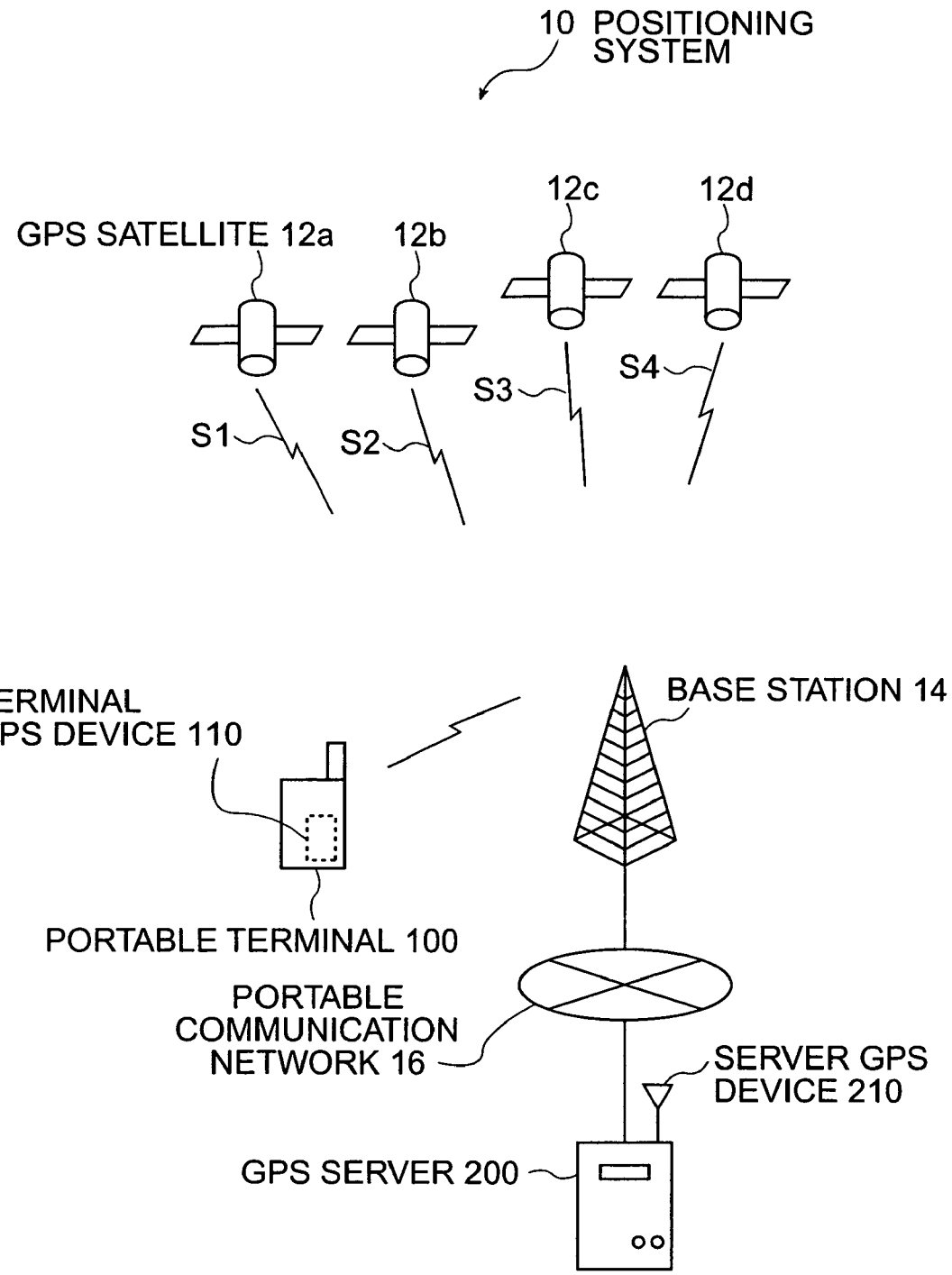
FIG. 2 is a view of a schematic diagram showing a positioning system according to the first embodiment of the present invention.

FIG. 2 is a view of a schematic diagram showing a positioning system 10 according to a first preferred embodiment of the present invention. A portable terminal 100 includes a terminal GPS device 110 and can perform positioning utilizing position related signals S1-S4 transmitted by GPS satellites 12a-12d that are examples of positional information satellites. In other words, the portable terminal 100 is an example of a positioning apparatus. The portable terminal 100 is, for example, a cellular phone, a Personal Handyphone System (PHS), or a Personal Digital Assistance (PDA) but is not limited to these devices.

Prior to performing positioning, through a base station 14 and a portable communication network 16 that is an example of a communication network, the portable terminal 100 requests a GPS server 200, which is an example of a positioning information providing apparatus, to transmit positioning information to be used for initial position setting.

The GPS server 200 includes a server GPS device 210 and receives and analyzes the position related signals S1 and so on to generate positioning information. The GPS server 200 stores the generated positioning information in a storage such that the GPS server 200 can immediately transmit the positioning information in response to a request from the portable terminal 100.

Main Hardware Configuration of the Portable Terminal 100

Figure 3:
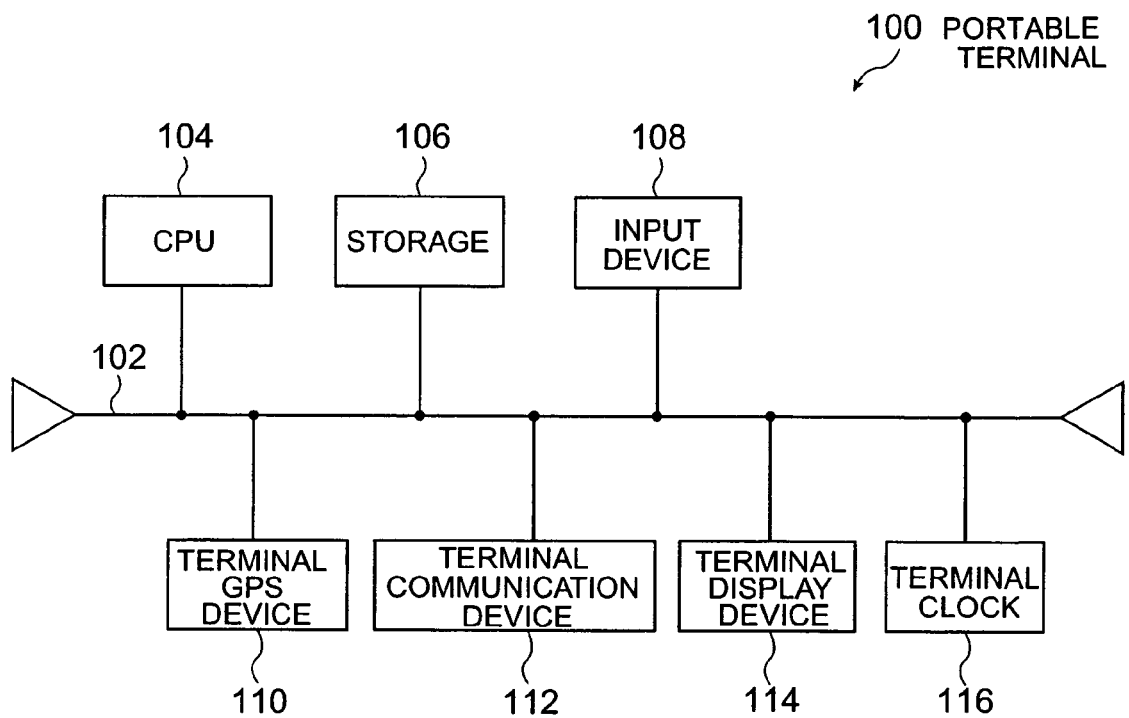
FIG. 3 is a view of a schematic diagram showing a main hardware configuration of a portable terminal shown in FIG. 2.

FIG. 3 is a view of a schematic diagram showing a main hardware configuration of the portable terminal 100 in FIG. 2. The portable terminal 100 includes a Central Processing Unit (CPU) 104 that has a control function and an arithmetic operation function, a storage 106, an input device 108 including operation buttons, and a terminal display device 114 that is a kind of an output device. All of the aforementioned components are connected to a bus 102. In other words, the portable terminal 100 includes a computer.

The CPU 104 is capable of exchanging data and control codes with other components such as the storage 106 through the bus 102. The CPU 104 reads and executes programs stored in the storage 106 to control thereby the entire portable terminal 100.

The storage 106 is constituted by, for example, a Random Access Memory (RAM) in which an Operating System (OS), various programs such as a device driver, and data are stored.

A terminal GPS device 110, which is connected to the bus 102, receives position related signals transmitted from GPS satellites S1-S4 and performs demodulation, decoding, and the like to acquire information necessary to perform positioning such as orbit information (an ephemeris and an almanac) of the GPS satellites S1-S4.

The terminal communication apparatus 112, which is connected to the bus 102, has a function of transmitting and receiving radio waves of a frequency used in a cellular phone system. Therefore, the portable terminal 100 can establish a connection with a nearest base station 14 and perform communication with the GPS server 200.

A terminal clock 116 is, for example, a Real Time Clock (RTC) and continues to operate and to supply time information to the OS of the portable terminal 100 even while a main power supply for the portable terminal 100 is off. The terminal clock 116 is also connected to the bus 102.

Main Hardware Configuration of the GPS Server 200

Figure 4:
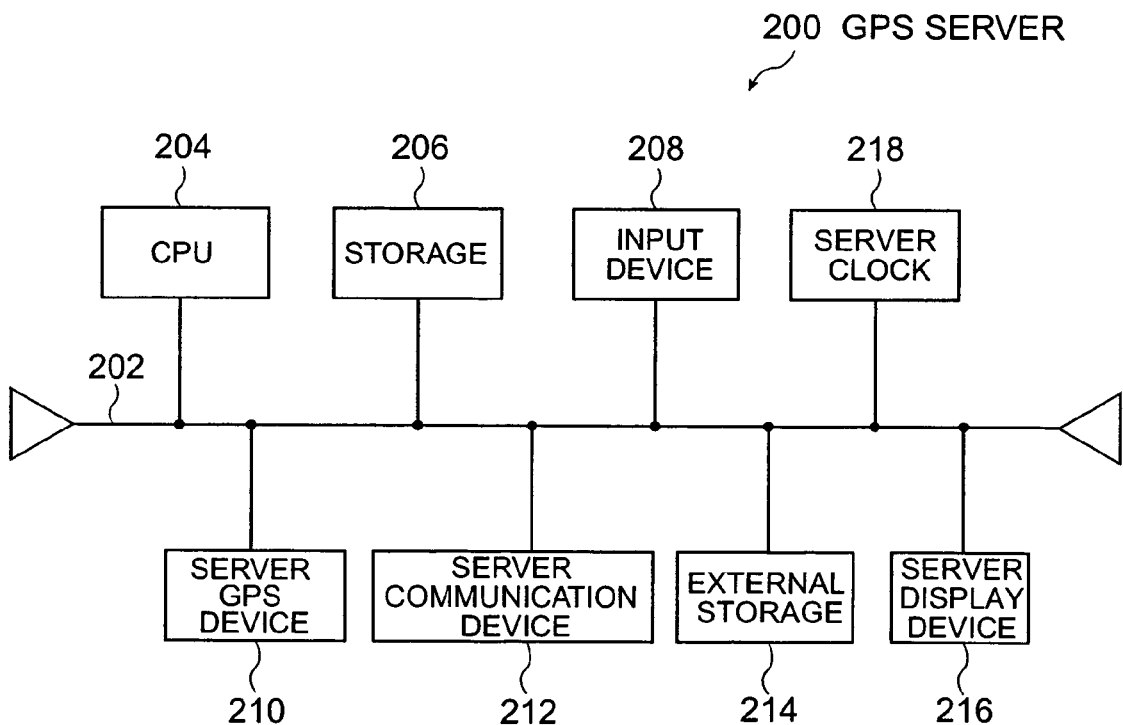
FIG. 4 is a view of a schematic diagram showing a main hardware configuration of a GPS server shown in FIG. 2.

FIG. 4 is a view of a schematic diagram showing a main hardware configuration of the GPS server 200 in FIG. 2. The GPS server 200 has a CPU 204, storage 206, input device 208, server GPS device 210, server communication device 212, external storage 214, server display device 216, and server clock 218, all connected to a bus 202. Explanations for components similar to those of the portable terminal 100 in FIG. 3 such as the CPU 204 are omitted and different sections will be explained.

A function of the server GPS device 210 is the same as that of the terminal GPS device 110. The GPS server 200 uses information acquired by the server GPS device 210 in order to generate positioning information.

Since the GPS server 200 is preferably connected to a portable communication network without the intervention of a base station, the server communication device 212 is constituted by, for example, an Ethernet adapter.

The GPS server 200 has the external storage 214 made of, for example, a hard disk in order to store the generated positioning information as a database.

Main Software Configuration of the Portable Terminal 100

Figure 5:
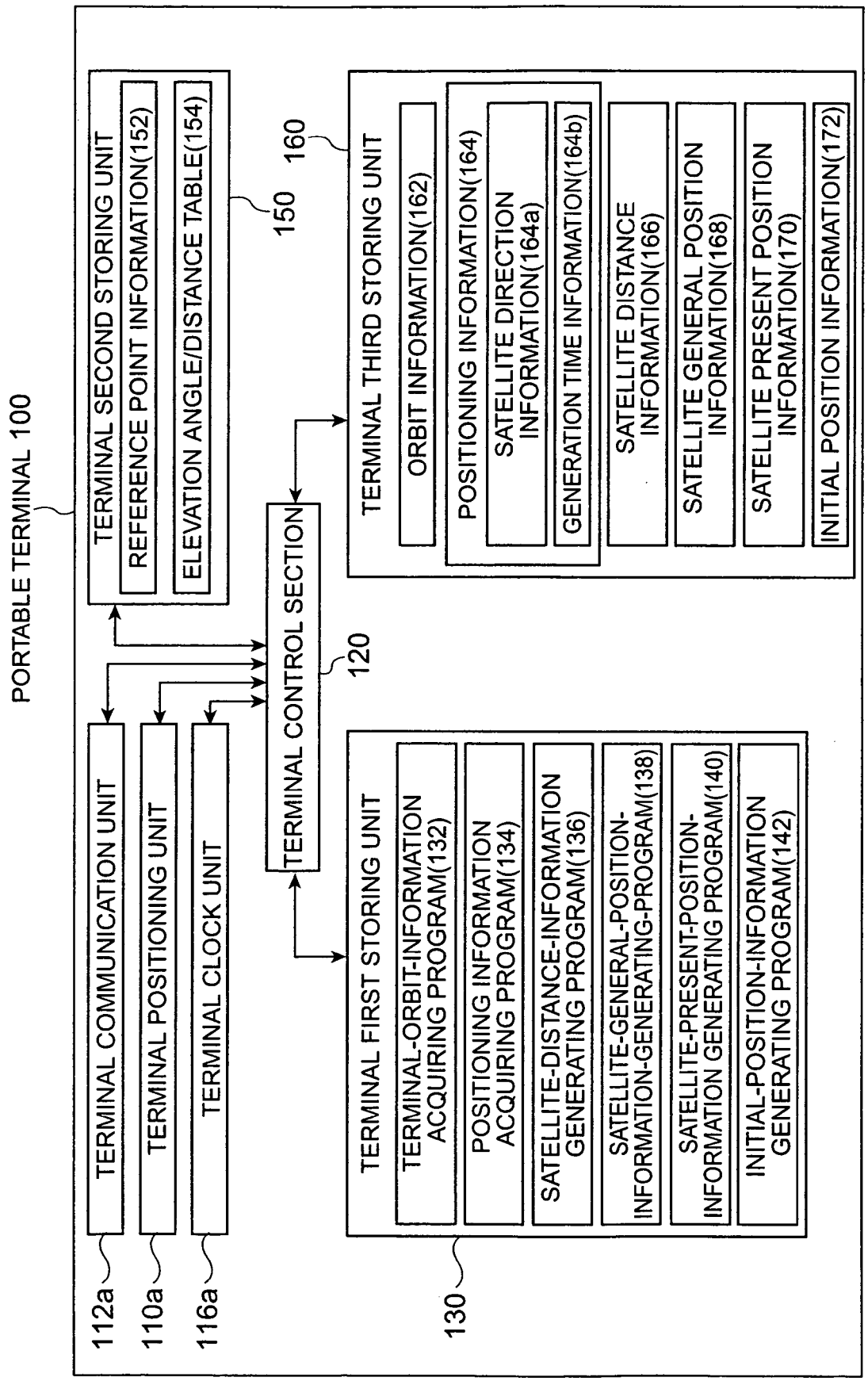
FIG. 5 is a view of a schematic diagram showing a main software configuration of the portable terminal shown in FIG. 2.

FIG. 5 is a view of a schematic diagram showing a software configuration of the portable terminal 100 shown in FIG. 2. A terminal control section 120 has functions such as memory management, task management, and input/output management and has a program to control an entire operation of the portable terminal 100. Specifically, the terminal control section 120 is implemented in the OS stored in the storage 106 and executed by the CPU 104.

A terminal communication section 112a, a terminal positioning section 110a, and a terminal clock section 116a are programs to control respectively the terminal communication device 112, the terminal GPS device 110, and a terminal clock device 116. These programs are implemented as, for example, a device driver and stored in the storage 106.

The CPU 104 sequentially reads and executes programs stored in a terminal first storing unit 130 under control of the terminal control section 120. The CPU 104 reads and acquires data necessary for execution of the programs from a terminal second storing unit 150 or a terminal third storing unit 160. Data acquired by the terminal control section 120 and data generated by the programs stored in the terminal first storing unit 130 are stored in the terminal third storing unit 160. Data stored in the terminal second storing unit 150 are data stored as fixed values because the data are less likely to fluctuate.

Note that the three storing units shown in FIG. 5 do not indicate that the portable terminal 100 has three storages physically independent from one another but indicate, for convenience of explanation, information stored in storages by classifying the information according to types thereof.

The terminal second storing unit 150 has reference point information 152 that stores reference point information that indicates coordinates of the reference point to calculate initial position information. Thus, the reference point information 152 is an example of a reference-point-information storing unit.

A terminal-orbit-information acquiring program 132, which is an example of the orbit information acquiring section on a positioning apparatus side, acquires information, which the terminal positioning section 110a has generated, by analyzing position related signals, extracts orbit information (an ephemeris and an almanac) of GPS satellites 12a-12d from the information, and stores the orbit information in the terminal third storing unit 160 as orbit information 162.

First, through the base station 14 and the portable communication network 16, a positioning information acquiring program 134, which is an example of the positioning information acquiring section, requests the GPS server 200 to transmit positioning information. Then, the positioning information acquiring program 134 receives positioning information transmitted by the GPS server 200 in response to this request and stores the positioning information in the third storing unit 160 as positioning information 164. The positioning information 164 includes satellite direction information 164a and generation time information 164b.

Figure 1A:
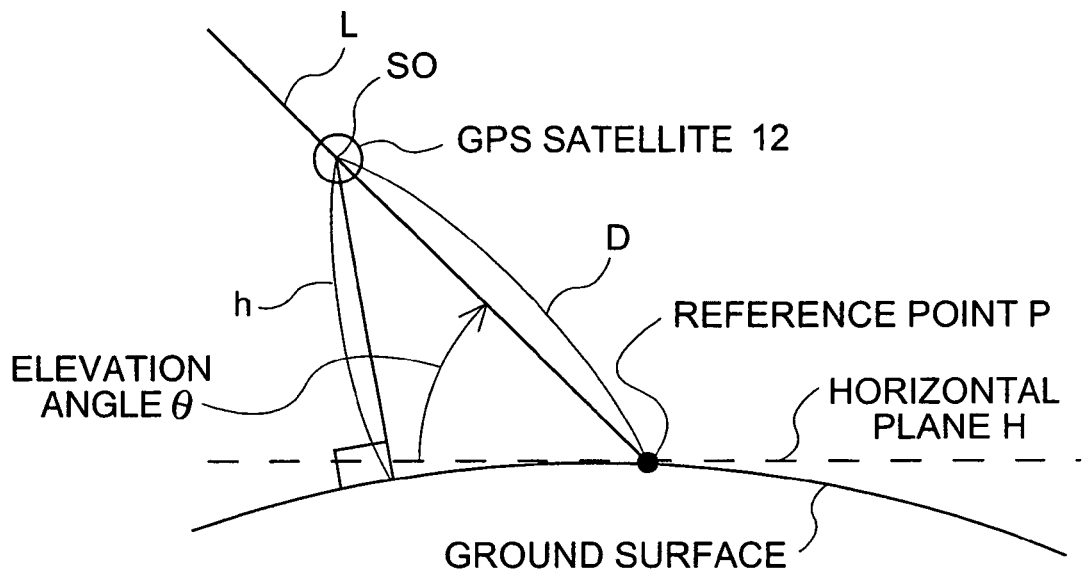
FIGS. 1A and 1B are views of schematic diagrams showing an initial position setting method according to a first preferred embodiment of the present invention.

A satellite-distance-information generating program 136, which is an example of the satellite-distance-information generating section, generates satellite distance information, which indicates a distance between a reference point and a GPS satellite 12a-12d at time when the positioning information is generated, on the basis of a satellite elevation angle (θ in FIG. 1A) included in the satellite direction information 164a.

Since the GPS satellite 12a-12d goes around on an elliptical orbit extremely close to a circle, an altitude (h in FIG. 1A) of the GPS satellite can be regarded as fixed. Therefore, if the elevation angle θ can be learned, it is possible to calculate a satellite distance (D in FIG. 1A) with geometrical calculations. In this embodiment, since the satellite distance may be extremely rough (less accurate), the satellite-distance-information generating program 136 generates a distance corresponding to the elevation angle as satellite distance information 166 with reference to an elevation angle/distance table 154 stored in the terminal second storing unit 150. Thus, the terminal second storing unit 150 is an example of an elevation angle/distance-associating-information storing unit. It is possible to reduce the amount of calculations needed to calculate satellite distance information significantly by using such a table.

FIG. 7 is a view of a schematic diagram showing a structure of the elevation angle/distance table 154. Theoretically, a lower limit value of an elevation angle is 0 degree. However, since it is highly probable that at least one satellite with a large elevation angle can be acquired whichever position on the earth a reference point is set and, actually, a satellite with a small elevation angle is not often used for positioning, a lower limit value of an elevation angle in the elevation angle/distance table 154 is preferably 30 degrees.

For example, when an elevation angle of a satellite is 60 degrees, the satellite distance information generating program 136 acquires 22000 km from a second line of the elevation angle/distance table and stores the numerical value in the terminal third storing unit 160 as the satellite distance information 166.

The elevation angle/distance table 154 is an example of the elevation angle/distance associating information and the terminal second storing unit 150 is an example of the elevation angle/distance associating information storing unit.

As seen in FIG. 5, a satellite-general-position-information generating program 138, which is an example of the satellite-general-position-information generating section, calculates a general position of a GPS satellite 12a-12d at time when the positioning information 164 is generated on the basis of the satellite direction information 164a and the satellite distance information 166.

Since a three-dimensional direction of a GPS satellite 12a-12d viewed from a reference point P is determined by an azimuth angle and an elevation angle included in the satellite direction information 164a acquired from the GPS server 200 (a straight line L in FIG. 1A), the satellite-general-position-information generating program 138 generates coordinates of a point (S0 in FIG. 1A) distant from the reference point by a length indicated in the satellite distance information 166 along the straight line L as satellite general position information 168.

A satellite-present-position-information generating program 140, which is an example of the satellite-present-position-information generating section, calculates a position of a GPS satellite 12 at a point when the portable terminal 100 performs positioning. The GPS satellite 12, a position of which is calculated, is identical with the GPS satellite for which the satellite general position information 168 is calculated.

A procedure for generating satellite present position information 170 is the same as a procedure for calculating a satellite position in usual GPS positioning. The satellite-present-position-information generating program 140 calculates coordinates of the GPS satellite 12 at the positioning time on the basis of an ephemeris, which is detailed orbit information included in the orbit information 162, and present time.

An initial-position-information generating program 142, which is an example of the initial-position-information generating section, generates an initial position that the portable terminal 100 uses in performing positioning, that is, provisional coordinates of the portable terminal 100.

Figure 1B:
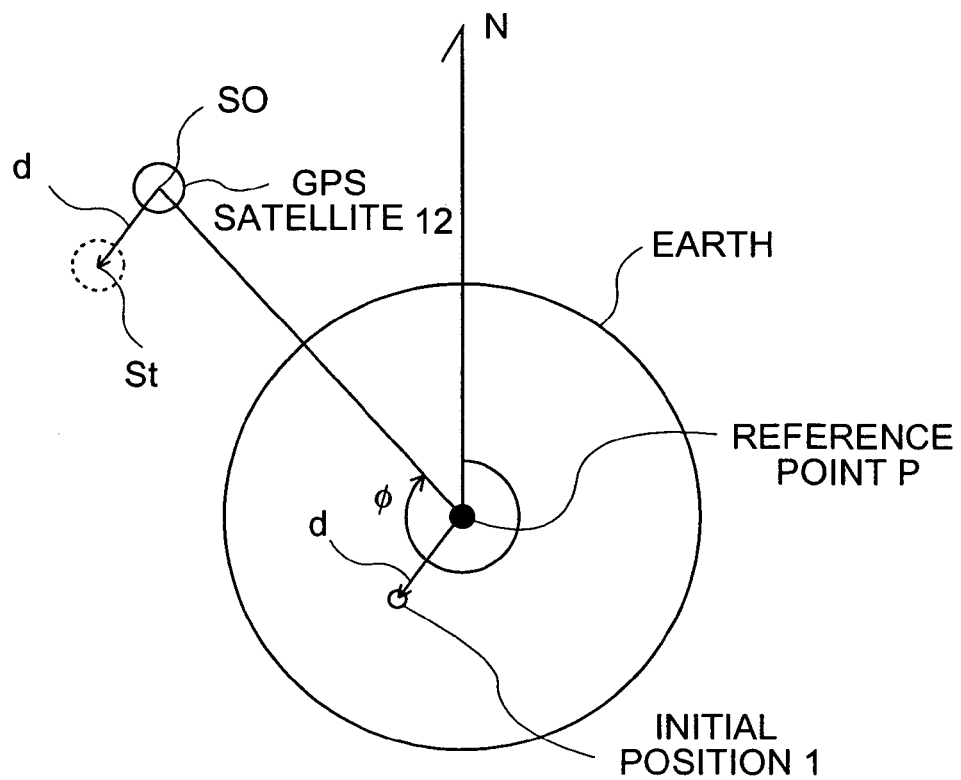

In FIG. 1B, when a vector with a satellite general position (S0) as a start point and a satellite present position (St) as an end point is set as d, it can be considered that a point (I) obtained by adding d to coordinates of the reference point P is a point close to a position of the base station 14 with which the portable terminal 100 is currently communicating. Therefore, the initial-position-information generating program 142 stores coordinates of the point (I) in the terminal third storing unit 160 as initial position information 172.

Referring to FIG. 5, in this way, the positioning information 164, which the portable terminal 100 in this embodiment acquires from the GPS serer 200, is small-sized data, namely, the satellite direction information 164a and the generation time information 164b. Thus, it is possible to reduce communication charges required for initial position setting.

An initial position can be set by geometrical calculation based on positioning information. Thus, it is possible to set the initial position easily without adding a hardware configuration to the conventional portable terminal.

Main Software Configuration of the GPS Server 200

Figure 6:
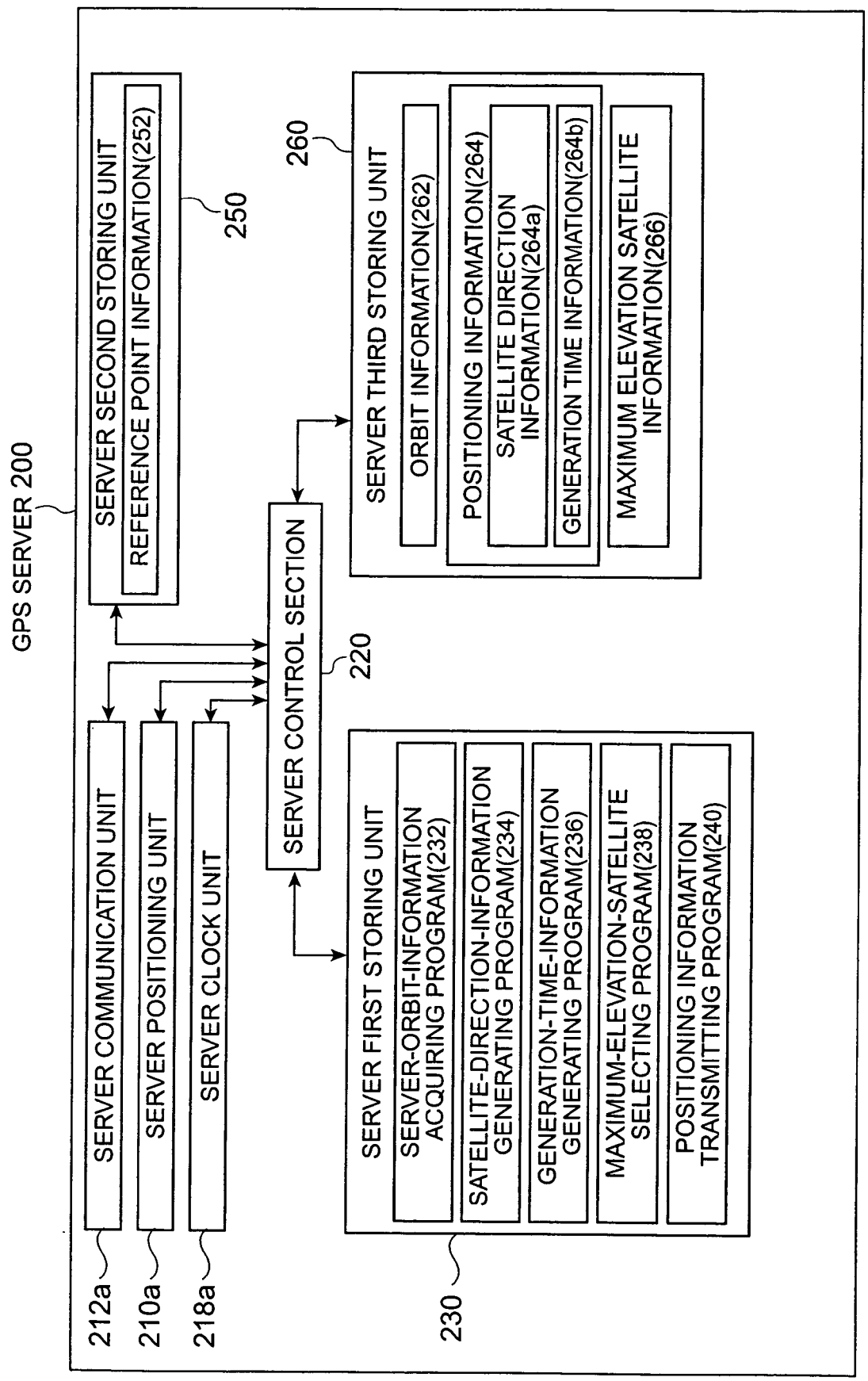
FIG. 6 is a view of a schematic diagram showing a main software configuration of the GPS server shown in FIG. 2.

FIG. 6 is a view of a schematic diagram showing a software configuration of the GPS server 200 shown in FIG. 2. A server control section 220 has functions such as memory management, task management, and input/output management and has a program to control an entire operation of the GPS server 200. Specifically, the server control section 220 is implemented in an OS stored in a storage 206 and executed by the CPU 204.

A server communication section 212a, a server positioning section 210a, and a server clock section 218a are programs to control respectively the server communication device 212, the server GPS device 210, and a server clock device 218. These programs are implemented as, for example, a device driver and stored in the storage 206.

The CPU 204 sequentially reads and executes programs stored in a server first storing unit 230 under control of the server control section 220. The CPU 204 reads and acquires data necessary for execution of the programs from a server second storing unit 250 or a server third storing unit 260. Data acquired by the server control section 220 and data generated by the programs stored in the server first storing unit 230 are stored in the server third storing unit 260.

Data stored in the server second storing unit 250 are data stored as fixed values because the data are less likely to fluctuate.

The server second storing unit has reference point information 252 that stores reference point information, and corresponds to the reference point information 152 of the portable terminal 100. Thus, the reference point information is an example of a reference-point-information storing unit.

A server-orbit-information acquiring program 232, which is an example of the orbit information acquiring section on a positioning information providing apparatus side, acquires information that the server positioning section 210a has generated by analyzing position related signals, extracts orbit information (an ephemeris and an almanac) of GPS satellites form the information, and stores the orbit information in the server third storing unit 260 as orbit information 262.

Note that acquisition of orbit information is not limited to the constitution like this embodiment. For example, it is also possible that the GPS server 200 itself does not include a GPS receiver and acquires orbit information from other servers through a communication network.

A satellite-direction-information generating program 234, which is an example of the satellite-direction-information generating section, calculates an elevation angle and an azimuth angle of a GPS satellite 12a-12d viewed from a reference point included in satellite direction information on the basis of reference point information 252 stored in the server second storing unit 250 and orbit information 262 stored in the server third storing unit 260. The satellite-direction-information generating program 234 stores the calculated elevation angle and azimuth angle in the server third storing unit 260 as satellite direction information 264a.

The satellite-direction-information generating program 234 generates the satellite direction information 264a for all GPS satellites 12a-12d that can be observed in a position of the GPS server 200. In addition, in order to make it possible to respond immediately to a request from the portable terminal 100, the satellite-direction-information generating program 234 repeatedly generates the satellite direction information 264a, for example, every ten minutes such that latest satellite direction information 264a for all the GPS satellites is stored in the server third storing unit 260.

At a point when the satellite-direction-information generating program 234 ends operation, a generation-time-information generating program 236, which is an example of the time information generating section, acquires the present time from the server clock section 218a through the server control section 220 and stores the present time in the server third storing unit 260 as generation time information 264b.

A maximum-elevation-satellite selecting program 238, which is an example of the maximum-elevation-satellite selecting section, is started when a request for positioning information is received from the portable terminal 100, searches through the satellite direction information 264a, and selects a GPS satellite 12a-12d with the largest elevation angle. The maximum-elevation-satellite selecting program 238 stores a number of the GPS satellite 12a-12d with a maximum elevation angle in the server third storing unit 260 as maximum elevation satellite information 266.

A positioning information transmitting program 240, which is an example of the positioning information transmitting section, transmits positioning information 264 including the satellite direction information 264a and the generation time information 264b to the portable terminal 100 through the portable communication network 16 and the base station 14 in response to a request from the portable terminal 100. Since the portable terminal 100 can generate the satellite general position information 168 if positioning information for one satellite can be acquired, the positioning information transmitting program 240 refers to the maximum elevation satellite information 266 and transmits positioning information for the GPS satellite with a maximum elevation angle to the portable terminal 100.

FIGS. 8A and 8B are views of tables in which sizes of positioning information transmitted to the portable terminal 100 in a conventional example to transmit a position of a base station and this embodiment are compared. FIG. 8A shows a table of data for the conventional example. The data include four items, namely, GPS time (seconds elapsed from the beginning of a week), a latitude, a longitude, and an altitude. A data size of the respective items is 4 bytes and a total data size is 16 bytes. FIG. 8B shows a table of data according to this embodiment. A data size of GPS time (the generation time information 264b in FIG. 6) is 4 bytes as in the conventional example. 1 byte is enough for an elevation angle because the elevation angle is an integer from 0 to 90. 2 bytes are enough for an azimuth angle because the azimuth angle is an integer from 0 to 360. A total data size is 7 bytes. The amount of data to be transmitted to the portable terminal is reduced significantly compared with the conventional example.

The positioning system 10 according to this embodiment is constituted as described above. Next, an example of main operations of the positioning system 10 will be explained.

Example of Main Operations of the Positioning System 10

Figure 9:
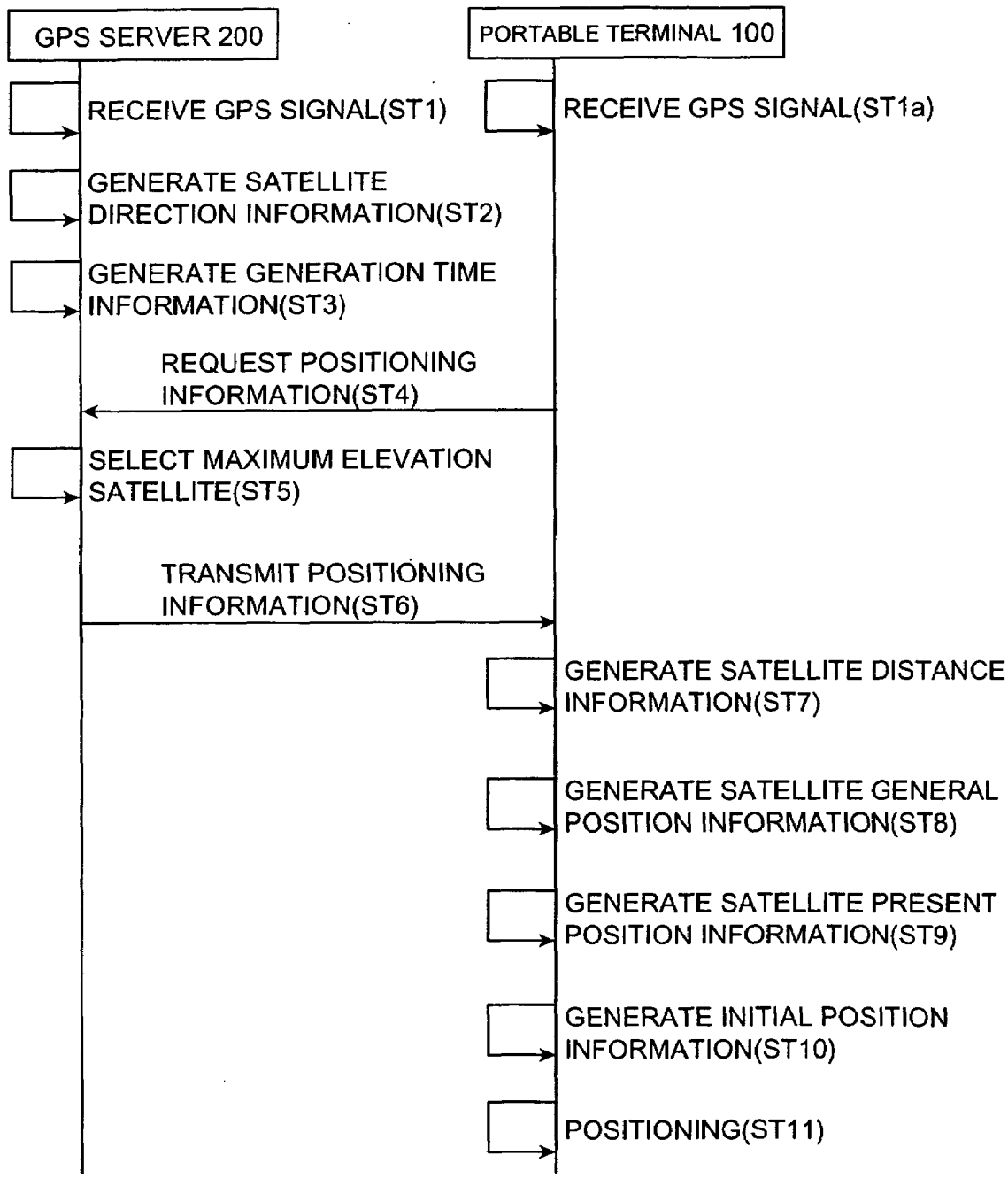
FIG. 9 is a view of a schematic flowchart showing an example of main operations of the positioning system of the first embodiment.

FIG. 9 is a view of a schematic sequence diagram showing an example of main operations of the positioning system 10. The GPS server 200 receives a position related signal transmitted from a GPS satellite 12a-12d to acquire orbit information and stores the orbit information in a storage (ST1, an example of the orbit information acquiring step on a positioning information providing apparatus side).

Next, the GPS server 200 generates satellite direction information including elevation angle information and azimuth angle information on the basis of the orbit information and stores the satellite direction information in the storage (ST2, an example of the satellite-direction-information generating step).

Next, the GPS server 200 acquires time when the satellite direction information is generated and stores the time in the storage as generation time information (ST3, an example of the time information generating step).

The GPS server 200 performs steps ST1 to ST3 repeatedly at predetermined time intervals and stores latest positioning information in the storage. The GPS server 200 waits for a positioning information request from the portable terminal 100.

The portable terminal 100 receives the position related signal transmitted from the GPS satellite 12a-12d to acquire orbit information and stores the orbit information in a storage (ST1a, an example of the orbit information acquiring step of terminal side).

The portable terminal 100 starts positioning according to an instruction from a user of the portable terminal 100, another person using a positional information service, or an apparatus other than the portable terminal 100. Then, first, the portable terminal 100 transmits a positioning information request to the GPS server 200 (ST4, an example of the positioning information acquiring step).

When the GPS server 200 receives the request from the portable terminal 100, first, the GPS server 200 refers to maximum elevation satellite information 266 and selects a GPS satellite 12a-12d having a maximum elevation angle from the satellites for which positioning information is generated (ST5).

Next, the GPS server 200 transmits positioning information for the GPS satellite 12a-12d selected in ST5 to the portable terminal 100 (ST6, an example of the positioning information transmitting step).

The portable terminal 100, which has received the positioning information, generates satellite distance information, which indicates a general distance from a reference point to the GPS satellite 12a-12d, on the basis of coordinates of the reference point and an elevation angle of the GPS satellite 12a-12d included in the positioning information and stores the satellite distance information in the storage (ST7, an example of the satellite-distance-information generating step).

Next, the portable terminal 100 generates satellite present position information, which indicates a position of the GPS satellite 12a-12d at the present time, on the basis of the satellite orbit information and the present time, and stores the satellite present position information in the storage (ST9, an example of the satellite-present-position-information generating step).

Next, the portable terminal 100 calculates coordinates of an initial position by adding a vector with the satellite general position (S0 in FIG. 1B) as a start point and the satellite present position (St in FIG. 1B) as an end point to the coordinates of the reference point and stores the coordinates in the storage (ST10, an example of the initial-position-information generating step).

The portable terminal 100 acquires the GPS satellite 12a-12d using the coordinates of the initial position calculated in ST10 and calculates a present position of the portable terminal 100 (ST11).

Communication between the portable terminal 100 and the GPS server 200 in ST4 and ST6 is performed through the base station 14 and the portable communication network 16. Communication between the portable terminal 100 and the base station 14 is performed by radio and communication between the GPS server 200 and the portable communication network 16 is performed by wire.

Example of Main Operations of the Portable Terminal 100

Figure 10:
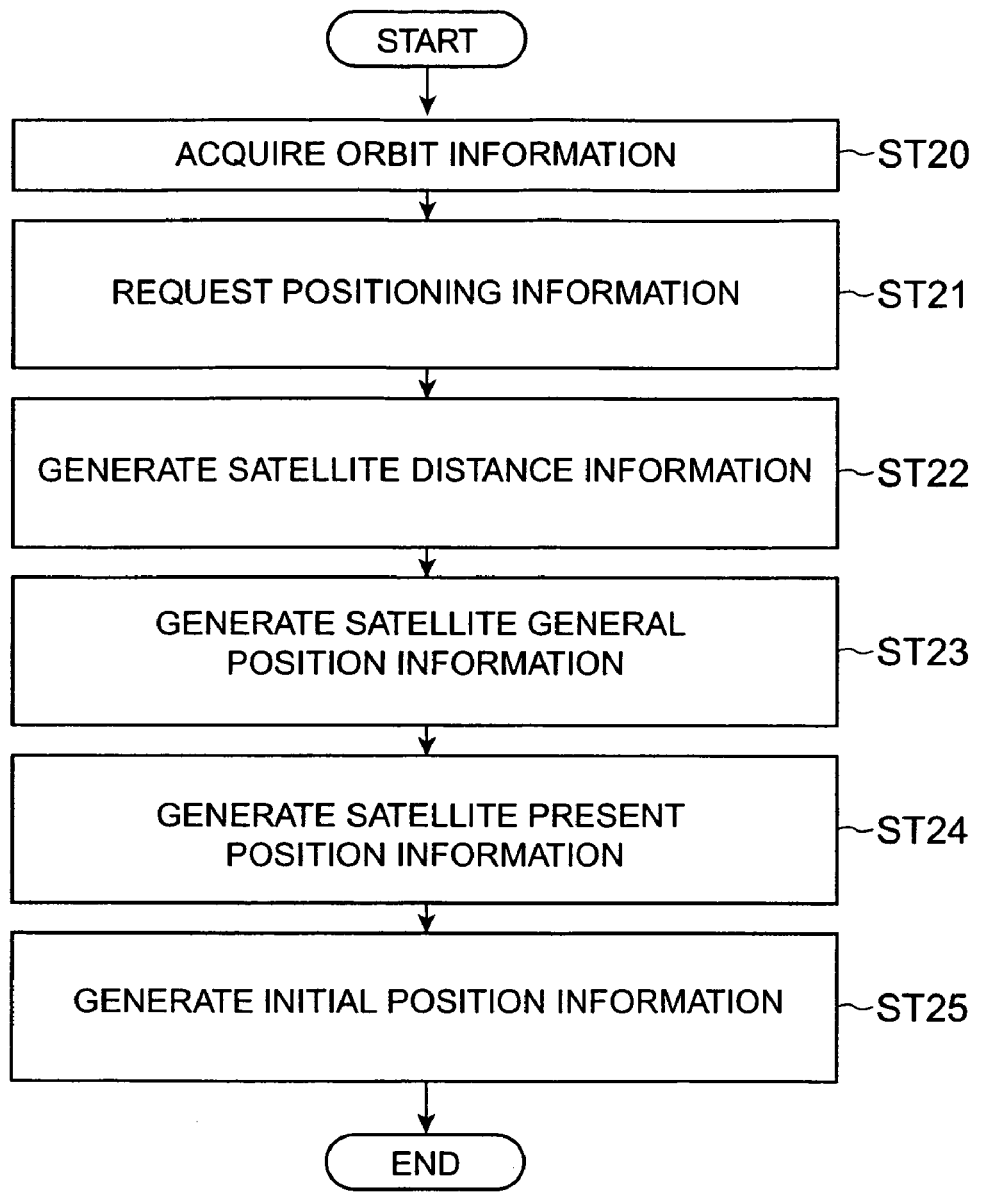
FIG. 10 is a view of a schematic flowchart showing an example of main operations of the portable terminal of the first embodiment.

FIG. 10 is a view of a schematic flowchart showing an example of main operations of the portable terminal 100 in this embodiment. The terminal positioning section 110a receives a position related signal transmitted by a GPS satellite 12a-12d to obtain data. The terminal-orbit-information acquiring program 132 analyzes the data to generate orbit information 162 and stores the orbit information 162 in the terminal third storing unit 160 (ST20).

Next, when positioning is instructed by a user or the like, the positioning information acquiring program 134 transmits a positioning information request to the GPS server 200, acquires the positioning information 164 including the satellite direction information 164a and the time information 164b, and stores the positioning information 164 in the terminal third storing unit 160 (ST21). Since the positioning information 164 acquired has a data size smaller than that in the conventional example, it is possible to reduce the amount of communication date to set an initial position.

The satellite-distance-information generating program 136 generates the satellite distance information 166 on the basis of an elevation angle of the GPS satellite 12a-12d included in the positioning information 164 and stores the satellite distance information 166 in the terminal third storing unit 160 (ST22). Since the satellite-distance-information generating program 136 generates the satellite distance information 166 with reference to the elevation angle/distance table stored in the terminal second storing unit 150, it is possible to generate the satellite distance information 166 in a short time.

The satellite-general-position-information generating program 138 generates the satellite general position information 168 on the basis of the satellite direction information 164a, the satellite distance information 166, and the reference point information 152 and stores the satellite general position information 168 in the terminal third storing unit 160 (ST23). Since the satellite-general-position-information generating program 138 can generate the satellite general position information 168 with simple geometrical calculations, it is possible to realize the generation of the satellite general position information 168 without adding a specific component to the conventional portable terminal.

The satellite-present-position-information generating program 140 generates the satellite present position information 170 on the basis of the orbit information 164 and the present time and stores the satellite present position information 170 in the terminal third storing unit 160 (ST24).

The initial-position-information generating program 142 generates the initial position information 172 on the basis of the satellite general position information 168, the satellite present position information 170, and the reference point position information 152 and stores the initial position information 172 in the terminal third storing unit 160 (ST25).

EXAMPLE OF MAIN OPERATIONS OF THE GPS SERVER 200

Figure 11:
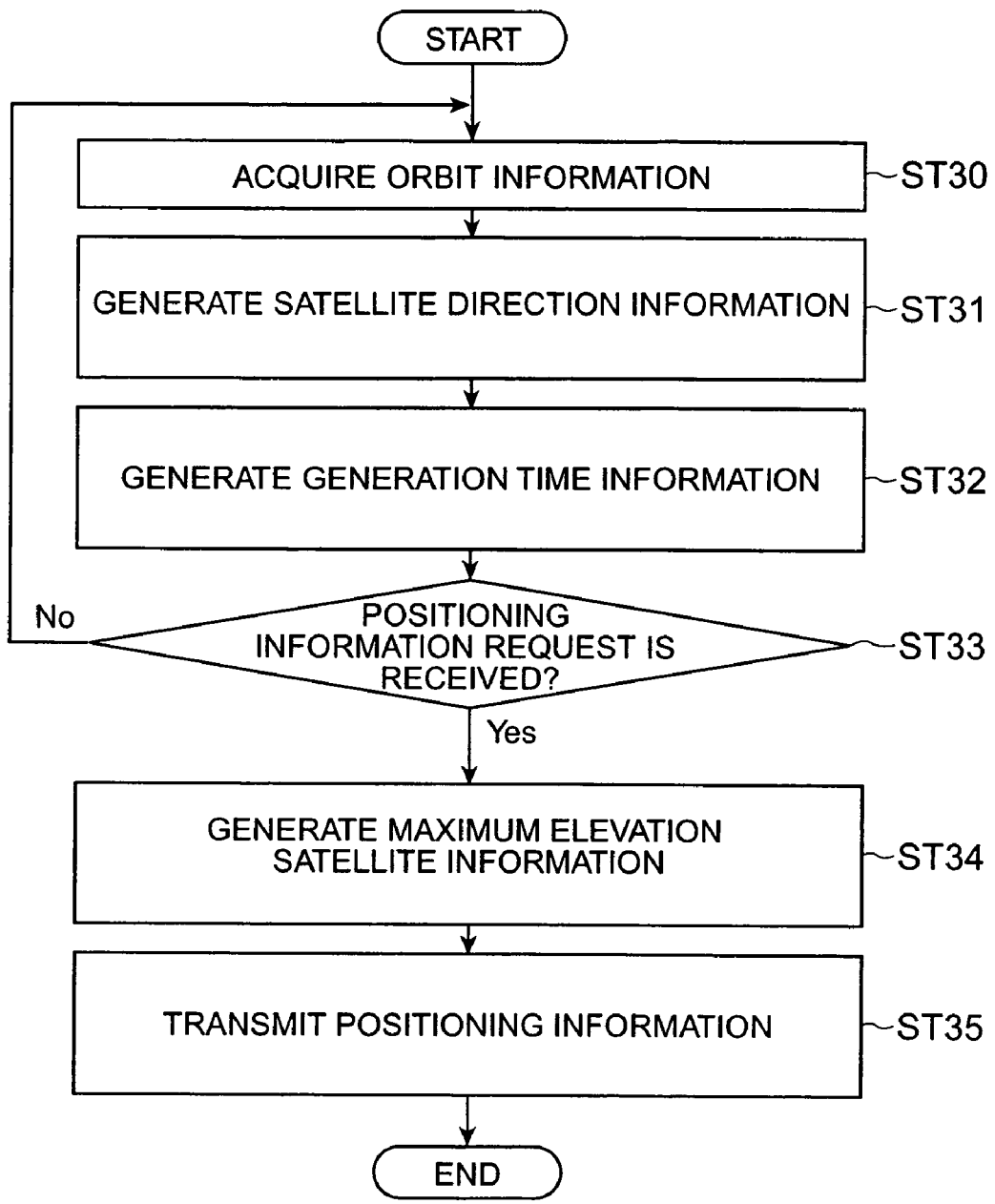
FIG. 11 is a view of a schematic flowchart showing an example of main operations of the GPS server of the first embodiment.

FIG. 11 is a view of a schematic flowchart showing an example of main operations of the GPS server 200 in this embodiment. The server positioning section 210a receives a position related signal transmitted by a GPS satellite 12a-12d to obtain data. The server-orbit-information acquiring program 232 analyzes the data to generate orbit information 262 and stores the orbit information 262 in the server third storing unit 260 (ST30).

The satellite-direction-information generating program 234 generates the satellite direction information 264a, which includes an elevation angle and an azimuth angle of the GPS satellite 12a-12d viewed from a reference point, on the basis of the server orbit information 262 and the reference point information 252 and stores the satellite direction information 264a in the server third storing unit 260 (ST31).

The generation-time-information generating program 236 acquires time when the satellite direction information 264a is generated from the server clock section 218a and stores the time in the server third storing unit 260 (ST32).

In this way, the GPS server 200 can generate the positioning information 264 necessary to set an initial position without using a database, in which positions of base stations are recorded, and provide the portable terminal 100 with the positioning information 264.

The server control section 220 judges whether a positioning information request is received from the portable terminal 100 (ST33). If there is no request, the server control section 220 repeats the operations from steps ST30 to ST32. If there is a request, the server control unit 220 performs operations in step ST34 and subsequent steps.

The maximum-elevation-satellite selecting program 238 selects a GPS satellite 12a-12d with a maximum elevation angle from the GPS satellites 12a-12d, for which the positioning information 264 is generated, and stores a number of the satellite in the server third storing unit 260 (ST34).

The positioning information transmitting program 240 transmits the positioning information 264 for the maximum elevation satellite selected in ST34 to the portable terminal 100 (ST35). Since a GPS satellite having a larger elevation angle is acquired by the portable terminal 100 more easily and is less affected by multi-paths, it is possible to increase a probability of the portable terminal 100 succeeding in setting of an initial position.

In this way, in the positioning system 10 of the invention, the GPS server 200 can generate information necessary to set an initial position without preparing a database, in which positions of base stations are stored, and provide the portable terminal 100 with the information. The portable terminal 100 can set an initial position using the information provided by the GPS server 200. In other words, it is possible to set easily an initial value in a positioning apparatus at a low cost.

A Program, A Computer Readable Recording Medium, and the Like

It is possible to obtain a control program or the like for a positioning system to cause a computer to execute the orbit information acquiring step on a positioning information providing apparatus side, the satellite-direction-information generating step, the time information generating step, the positioning information transmitting step, the orbit information acquiring step on a positioning apparatus side, the positioning information acquiring step, the satellite-distance-information generating step, the satellite-general-position-information generating step, the satellite-present-position-information generating step, the initial-position-information generating step, and the like in the example of operation.

It is also possible to obtain a computer readable recording medium having recorded therein such a control program or the like for a positioning system.

It is possible to realize a program storage medium, which is used for installing the control program for a positioning system or the like in a computer and bringing the control program or the like into a state the control program or the like is executable by the computer, not only with a flexible disk such as floppy (registered trademark) and a package medium such as a Compact Disc Read Only Memory (CD-ROM), a compact Disc-Recordable (CD-R), a Compact Disc-Rewritable (CD-RW), or a Digital Versatile Disc (DVD) but also with a semiconductor memory, a magnetic disk, a magneto-optical disk, or the like in which a program is stored temporarily or permanently.

The invention is not limited to the respective embodiments described above. The respective embodiments may be combined with one another.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A positioning system comprising:
    a positioning apparatus being configured to perform positioning of said positioning apparatus by utilizing positional information satellites;
    a positioning information providing apparatus being configured to provide positioning information being used by said positioning apparatus to generate an initial position information generally indicating an initial position of said positioning apparatus;
    a communication network being configured to allow said positioning apparatus to communicate with said positioning information providing apparatus; and
    a base station being configured to mediate communication between said positioning apparatus and said positioning information providing apparatus,
    the positioning information providing apparatus including
        an orbit information acquiring section on a positioning information providing apparatus side acquiring orbit information indicating orbits of said positional information satellites,
        a reference-point-information storing unit on a positioning information providing apparatus side storing reference point information indicating coordinates of a reference point serving as a reference to calculate said initial position information,
        a satellite-direction-information generating section generating satellite direction information indicating elevation angles and azimuth angles of said positional information satellites at said reference point on the basis of said orbit information and said reference point information,
        a time information generating section generating time information indicting a time when said positioning information providing apparatus generates said satellite direction information, and
        a positioning information transmitting section transmitting said positioning information to said positioning apparatus in response to a request from said positioning apparatus, and
    said positioning apparatus including
        an orbit information acquiring section on a positioning apparatus side acquiring said orbit information,
        a reference-point-information storing unit on said positioning apparatus side storing said reference point information,
        a positioning information acquiring section acquiring said satellite direction information and said time information from said positioning information providing apparatus through said communication network,
        a satellite distance information generating unit generating satellite distance information indicating distances between said reference point and said positional information satellites on the basis of said reference point information and said satellite direction information,
        a satellite-general-position-information generating section generating satellite general position information indicating general positions of said positional information satellites at the time when the satellite direction information is generated on the basis of said reference point information and said satellite direction information,
        a satellite-present-position-information generating section generating satellite present position information indicating positions of the positional information satellites at a point when said positioning apparatus performs positioning on the basis of said orbit information, and
        an initial-position-information generating section generating said initial position information on the basis of said reference point information, said satellite general position information, and said satellite present position information,
    said initial position being at an end of a vector added on said reference point, the vector being same as a vector from the satellite general position to the satellite present position.

2. A positioning system according to claim 1, wherein said positioning apparatus includes an elevation angle/distance-associating-information storing unit that stores elevation angle/distance associating information that associates elevation angles of said positional information satellites and said satellite distance information, and said satellite-distance-information generating section generates said satellite distance information on the basis of said elevation angle/distance-associating information.

3. A positioning system according to claim 1, wherein said positioning information providing apparatus includes a maximum-elevation-satellite selecting section that selects a maximum elevation satellite that is a positional information satellite having the largest elevation angle at the reference point at a point when said positioning information is generated apart from said positional information satellite, and said positioning information providing apparatus provides said positioning apparatus with said satellite direction information, said satellite distance information, and said time information for said maximum-elevation satellite.

4. A positioning information providing apparatus that provides a positioning apparatus that performs positioning of said positioning apparatus by utilizing positional information satellites with positioning information that the positioning apparatus uses in order to generate an initial position information generally indicating an initial position of the positioning apparatus through a communication network and a base station mediating communication, the positioning information providing apparatus comprising:
- an orbit information acquiring section on a positioning information providing apparatus side acquiring orbit information indicating orbits of the positional information satellites;
- a reference-point-information storing unit on a positioning information providing apparatus side storing reference point information indicating coordinates of a reference point serving as a reference to calculate the initial position information;
- a satellite-direction-information generating section generating satellite direction information indicating elevation angles and azimuth angles of the positional information satellites at the reference point on the basis of the orbit information and the reference point information;
- a time information generating section generating time information indicting time when the positioning information providing apparatus generates the satellite direction information and satellite distance information; and
- a positioning information transmitting section transmitting the positioning information to the positioning apparatus in response to a request from the positioning apparatus,
- said initial position being at an end of a vector added on said reference point, the vector being same as a vector from the satellite general position to the satellite present position.

5. A positioning apparatus that performs positioning of said positioning apparatus by utilizing positional information satellites, the positioning apparatus comprising:
- an orbit information acquiring section on a positioning apparatus side being configured to acquire orbit information;
- a reference-point-information storing unit on a positioning apparatus side storing the reference point information;
- a positioning information acquiring section being configured to acquire satellite direction information and time information from the positioning information satellite though a communication network;
- a satellite distance information generating unit being configured to generate satellite distance information indicating distances between a reference point and the positional information satellites on the basis of said reference point information and said satellite direction information;
- a satellite-general-position-information generating section being configured to generate satellite general position information indicating general positions of the positional information satellites at the time when the satellite direction is generated on the basis of said reference point information and said satellite direction information;
- a satellite-present-position-information generating section being configured to generate satellite-present-position-information indicating positions of the positional information satellites at a point when the positioning apparatus performs positioning on the basis of said orbit information; and
- an initial-position-information generating section being configured to generate initial position information on the basis of said reference point information, said satellite general position information, and said satellite present position information,
- said initial position being at an end of a vector added on said reference point, the vector being same as a vector from the satellite general position to the satellite present position.

6. A positioning method comprising:
- acquiring orbit information indicating orbits of the positional information satellites on a positioning information providing apparatus side in which an orbit information acquiring section on said positioning information providing apparatus side of a positioning information providing apparatus, providing a positioning apparatus being configured to perform positioning of said positioning apparatus by utilizing positional information satellites with positioning information being used by send positioning apparatus to generate initial position information generally indicating an initial position of said positioning apparatus through a communication network and a base station being configured to mediate communication;
- storing reference point information indicating coordinates of a reference point serving as a reference to calculate said initial position information indicating a general position of said positioning apparatus on said positioning information providing apparatus side by a reference-point-information storing unit on said positioning information providing apparatus side of said positioning information providing apparatus;
- a generating satellite direction information indicating elevation angles and azimuth angles of said positional information satellites at a reference point on the basis of said orbit information and said reference point information a satellite-direction-information generating section of said positioning information providing apparatus;
- generating time information indicating time when said positioning information providing apparatus generates said satellite direction information by a time information generating section of said positioning information providing apparatus;
- transmitting step said positioning information to said positioning apparatus in response to a request from said positioning apparatus by a positioning information transmitting section of said positioning information providing apparatus;
- acquiring orbit information on said positioning apparatus side by an orbit information acquiring section on said positioning apparatus side of said positioning apparatus;
- storing reference point information on said positioning apparatus side by a reference-point-information storing unit on said positioning apparatus side of said positioning apparatus;
- acquiring step said satellite direction information and said time information from said positioning information providing apparatus through said communication network by a positioning information acquiring section of said positioning apparatus;

a satellite distance information generating step in which a satellite distance information generating unit of the positioning apparatus generates satellite distance information, which indicates distances between the reference point and the positional information satellites, on the basis of the reference point information and the satellite direction information;

generating satellite distance information indicating distances between said reference point and said positional information satellites on the basis of said reference point information and said satellite direction information by a satellite-general-position-information generating section of the positioning apparatus;

generating satellite general position information indicating general position of said positional information satellites at the time when the satellite direction is generated on the basis of said reference point information and said satellite direction information by a satellite-present-position-information generating section of said positioning apparatus; and generating satellite-present-position-information indicating position of said positional information satellites at a point when said positioning apparatus performs positioning on the basis of said orbit information by an initial-position-information generating section of said positioning apparatus, said initial position being at an end of a vector added on said reference point, the vector being same as a vector from the satellite general position to the satellite present position.

7. A control program for a positioning system having code causes a computer to execute the positioning method of claim 6.

8. A computer readable recording medium having recorded therein the control program for a positioning system according to claim 7.

* * * * *